United States Patent
Frey

(10) Patent No.: US 7,093,895 B2
(45) Date of Patent: Aug. 22, 2006

(54) AIRCRAFT PASSENGER SEAT

(75) Inventor: Andreas Frey, Immenstaad (DE)

(73) Assignee: Recaro Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 11/051,636

(22) Filed: Jan. 27, 2005

(65) Prior Publication Data

US 2005/0168019 A1    Aug. 4, 2005

(30) Foreign Application Priority Data

Jan. 30, 2004    (DE)    ................ 10 2004 004 874

(51) Int. Cl.
*B60N 2/427*    (2006.01)
(52) U.S. Cl. ................ 297/216.13; 297/216.12; 297/216.14; 297/440.2
(58) Field of Classification Search ............ 297/216.1, 297/216.12, 216.13, 216.14, 216.15, 440.1, 297/440.2
See application file for complete search history.

(56) References Cited

U.S. PATENT DOCUMENTS

| | | | |
|---|---|---|---|
| 5,609,395 A | * | 3/1997 | Burch .................... 297/452.55 |
| 5,829,836 A | * | 11/1998 | Schumacher et al. ....... 297/257 |
| 5,882,072 A | * | 3/1999 | Morlock ................. 297/216.13 |
| 6,003,937 A | | 12/1999 | Dutton et al. |
| 6,557,929 B1 | * | 5/2003 | Fox et al. .................... 280/751 |
| 6,733,064 B1 | * | 5/2004 | Fox et al. .................. 296/68.1 |
| 6,769,739 B1 | | 8/2004 | Salzer |

FOREIGN PATENT DOCUMENTS

| | | |
|---|---|---|
| EP | 0 945 302 A1 | 9/1999 |
| EP | 100 19 484 A1 | 10/2001 |

* cited by examiner

*Primary Examiner*—Peter R. Brown
(74) *Attorney, Agent, or Firm*—Roylance, Abrams, Berdo & Goodman, L.L.P.

(57) ABSTRACT

A seat, in particular an aircraft passenger seat, has a seat component (10) and a backrest component (12) made at least in part of shell components. One shell component (22) is detachably connected to other components of the seat by a fastening mechanism. In the event of sudden introduction of force, as in the event of a crash, the shell component (22) is detached from the other components of the seat. A passive element is created by the shell component. When normal operating forces are present, that is, in the normal operating state of the seat, the passive element retains its position and shape. In the event of introduction of large force impulses, such as in sudden introduction of force in the event of a crash, the passive element is detached from the remaining shell structure of the seat without significant reaction forces being generated, which might cause injury of the seat occupant, and creates a free space in the seat.

20 Claims, 3 Drawing Sheets

AIRCRAFT PASSENGER SEAT

FIELD OF THE INVENTION

The present invention relates to a seat, in particular an aircraft passenger seat, having a seat component and a backrest component which are made at least in part of shell components.

BACKGROUND OF THE INVENTION

Aircraft passenger seats have been provided in a plurality of embodiments. Such seats must meet a number of very high safety standards, and are subjected to dynamic testing, especially in crash tests. The HIC (head impact criteria) value must fall below 1000 in such tests to ensure the safety of the seat occupant in the event of a crash. To make it possible to ensure the cost effectiveness of flights, the spacing between the individual rows of seats is accordingly reduced, in the economy class in particular. As a result of the spacing reduction, a seat occupant may come into contact with the rear components of the seat mounted in front of this passenger. To configure these areas of the seat to be safe, provision has been made in the conventional seats such that this rear seat area is designed to be flexible enough to avoid subjecting the seat occupant to the action of significant harmful forces expected in the event of a crash. However, the dynamic tests indicate that such conventional seats are capable only to a limited extent of protecting a seat occupant from injuries in the event of a crash.

SUMMARY OF THE INVENTION

Objects of the present invention are to provide a passenger seat having a HIC value falling below 1000 and protecting the respective seat occupant from injury in the event of a crash.

The foregoing objects attained by a seat, particularly an aircraft passenger seat, having at least one shell component detachably connected to the other components of the seat by a fastening mechanism. In the event of sudden application of force, as in the event of a crash, for example, the shell component is detached by the fastening mechanism from the other seat components. The shell component forms a passive element which retains its position and shape when normal operating forces are present, that is, under normal seat operating conditions. In the event of strong force momentum, as in the event of application of force if a crash occurs, the shell component creates a free space in the seat, and is detached from the remaining shell structure of the seat without generating in the process significant reaction forces which might exert a harmful effect on the seat occupant.

The present invention is designed such that, in the event of any impact, the shell component, as a corresponding component of the structure of the seat, is detached from the seat, but without the detachment of the structural or seat component resulting in an additional endangerment of the passenger or seat occupant. In one preferred embodiment of the seat of the present invention, the shell component is integrated into the backrest component and is a component of the backrest. In addition, the shell component is configured to be wedge-shaped in cross-section and to be large enough especially in extent so that, when parts of the head of the seat occupant seated in the following row of seats are subject to impact, such parts are safely caught in the event of any impact in a crash.

In one preferred embodiment of the seat of the present invention, the shell component, is designed essentially as a hollow shell, and has on its upper side a foam edge. When the head of the seat occupant is struck, the foam component flexibly gives way, thereby affording protection from impact. In addition to the shock absorption by the foam, the shell component is detached from the other shell components of the seat. Practical dynamic tests have shown that the head impact criteria (HIC) value may easily fall below 1000, even in the event of unfavorable impact angles. Because of the shock absorbing foam in the edge area of the shell component, the shell component will yield and may be detached from the remainder of the structure of the seat.

The seat of the present invention need not be limited to aircraft passenger seats, but may also be applied in other vehicles such as buses, ferries, or the like.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawing which form a part of this disclosure.

DETAILED DESCRIPTION OF THE INVENTION

A modern aircraft passenger seat of the latest generation is described, for example in DE 100 19 484 and U.S. Pat. No. 6,769,739 to Salzer, the subject matter of which is hereby incorporated by reference. The aircraft passenger seat disclosed has a seat component and a backrest movable relative to each other by at least one adjusting mechanism. The adjusting mechanism has several adjustment positions connected to each other at least in part by a supporting bar framework. The framework has individual bar elements which hold the seat component in position above the floor of a vehicle or cabin. The components of the aircraft passenger seat execute adjustment movements by an actuating mechanism in such a way that the seat component may be moved from its initial position to at least one other position or back from this position. In addition to the seat component, the other components of the seat, such as foot and leg rest and backrest, may be adjusted to a plurality of degrees of freedom of movement in such a way that a rest position is provided for the seat occupant in addition to various comfort positions. In the rest position, the backrest is made to follow the tilt of the seat component over a limited distance as a result of pivoting movement of the supporting bar framework by a constraint so that a rest surface extending diagonally is reached for the seat. Such seats are utilized preferably in first class or business class of an aircraft.

Figure 1:
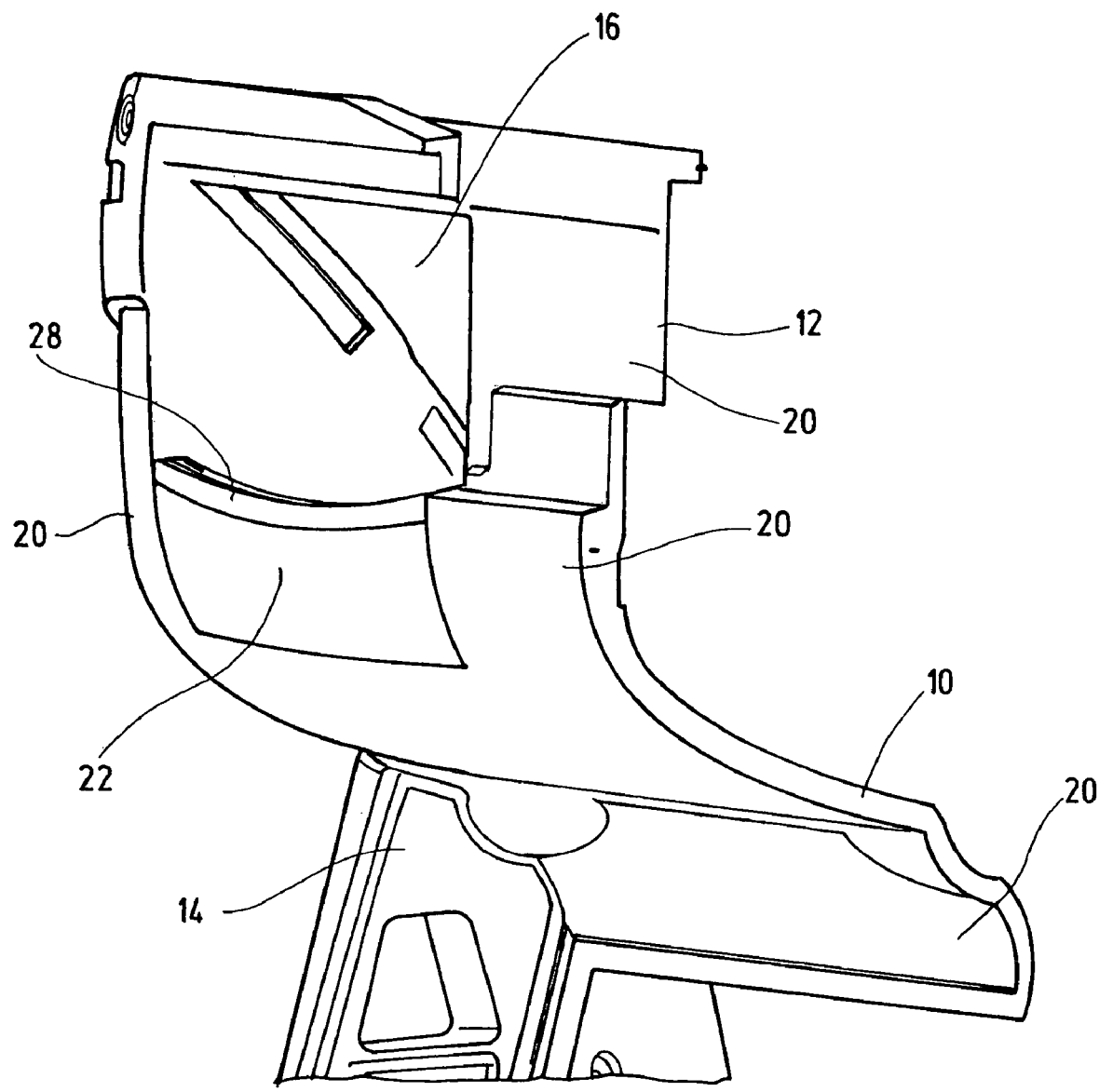
FIG. 1 is a rear elevational view of the basic structure of an aircraft passenger seat according to an embodiment of the present invention.

To increase comfort, components of such first and business class seats are increasingly being extended at least to some extent to economy class seats. The features relating to comfort adjustments of the economy class seats are generally kept simpler for reasons of space conservation and to reduce costs. An example of the basic structure of an economy-class seat is shown in FIG. 1. The seat has a seat component 10, which in the upward direction, undergoes a transition to a backrest component 12. The angles of tilt of the backrest component 12 relative to the seat component 10 may be adjusted by a seat occupant within prescribed limits to increase comfort. In addition, the components 10, 12, may be moved to an upright position relative to the cabin or vehicle floor (not shown) by a support component 14.

Figure 3:
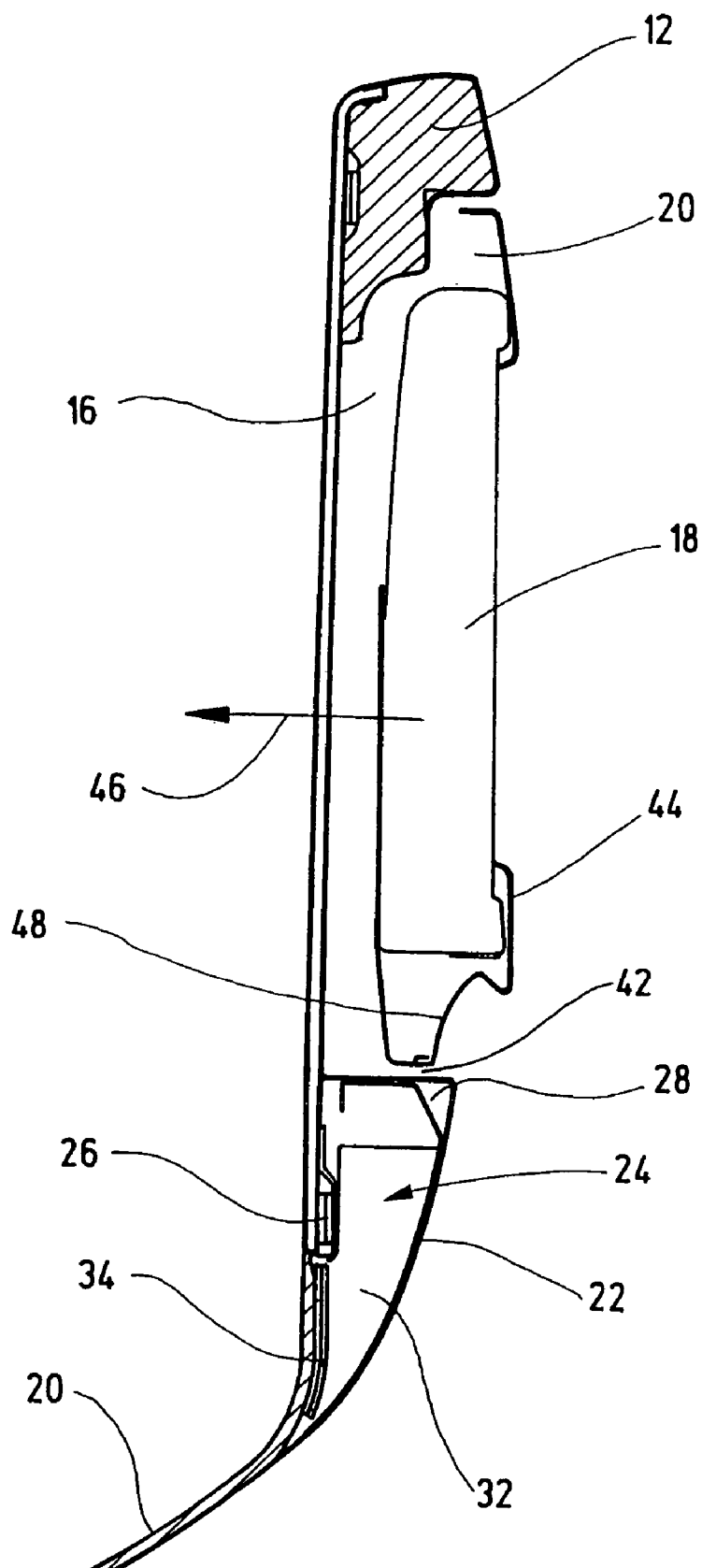
FIG. 3 is a side elevational view in section of the upper area of the backrest with shell component of the seat of FIG. 1, with a display monitor introduced.

The backrest component 12 shown in FIG. 1 has in its upper area a cutout 16 for mounting a display monitor 18, as is shown in FIG. 3. Integrations of display monitors 18 are known, for example, from the seats of ICE trains or the like. As also shown in FIGS. 1 and 3, the seat illustrated is made up at least in part of shell components 20. One shell components 22 extends in the central area of the backrest component 12 transversely relative to the longitudinal extent of this backrest component 12, and is integrated into backrest component 12 between the spar-like shell components of the backrest component 12. A flush connection exists between the adjacent shell components 20 and the shell component 22 introduced in the center. The shell component 22 is detachably connected to the other components of the seat by a fastening mechanism. This shell component 22 is detached from the other components 26 of the seat in the event of a sudden introduction of force, as for example in the event of a crash.

Figure 2:
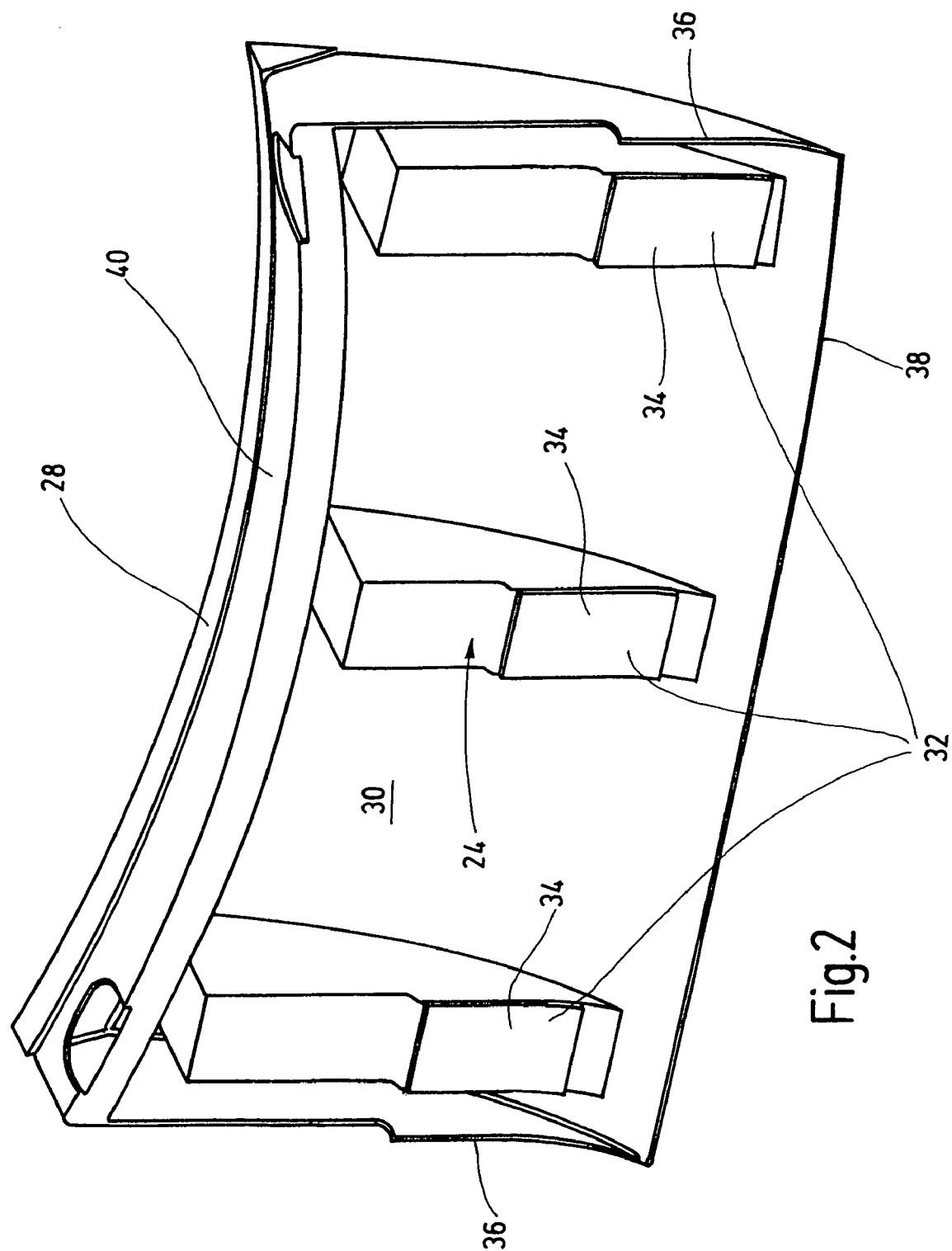
FIG. 2 is a front elevational view of the shell component of the seat presented in FIG. 1.

As is also shown in FIG. 1, the shell component 22 is integrated into the backrest component 12, and thus is a component of the backrest. The shell component 22 retains its shape and position in normal use of the seat. As also shown in FIGS. 2 and 3, shell component 22 is more or less wedge-shaped as viewed in cross-section. Its planiform extension in the longitudinal and transverse directions of the backrest component 12 is selected so that the head, in particular of a seat occupant seated in the following row of seats (not shown), can be restrained safely in the event of any collision in a crash.

Dynamic collision tests, in particular, have shown that impact of parts of the passenger's face is to be anticipated in the seat upper area, that is, by the upper edge 28 of the shell component 22. This upper edge 28 is configured as a cushioned edge, or is even provided with an edge of foamed material. This upper edge makes it possible to deflect shell component 22 downward at all angles of impact with the passenger's head that might possibly occur after separation of the fastening mechanism 24 detaching component 22 from the remaining seat structure with its shell components 20. Consequently, however, the shell component 22 creates free space in the rear area of the seat in the presence of the high force impulses. Thus, the impact forces and the possible danger of injury to the seat occupant are significantly reduced. The shell component 22 is configured in such a way and is detachable from the seat structure such that no forces of reaction may occur which might contain the potential of additional injury to the seat occupant. Nor can separation of the shell component 22 create danger from loose components. By preference the shell component 22 is connected to the remainder of the seat structure by way of an elastic foil (not shown) which optionally is covered by other upholstery components or cover materials.

As also shown in FIGS. 2 and 3, the shell component 22 is wedge-shaped as viewed in cross-section, and is also configured as a hollow shell. Three bracing webs 32 are in the respective cavity 30 for contact with the other components 26 in the rear area of the backrest component 12. Two of the bracing webs in question are mounted in the area of the side edges 36 of the shell component 22. One bracing web 32 is mounted between the other two bracing webs and in the central area of the shell component 22. Each bracing web is oriented vertically within the cavity 30, and has a stepped shoulder 34 extending from it. The stepped shoulder 34 is integrated at least in the rear area into the associated side edge 36 of the shell component 22. A strip of adhesive or a part of an adherent strip closure (hook-and-loop fastener) may be mounted in front on the shoulder 34 to form a detachable connection with the associated components 26 of the fastening mechanism 24.

The lower edge 38 of the shell component 22, as viewed in the direction of FIG. 2, is oriented to extend more or less horizontally. The upper edge 28 in the form of foamed edging has a concave recess 40. The concave recess 40 is provided, among other things, on the basis of ergonomic considerations to create a possible favorable impact surface for the head area of the seat occupant and to this extent also forms a favorable transitional area 42 in view of the convex configuration of the lower side of the display monitor 18. The display monitor 18 is linked to be movable over a determined pivoting area in the upper shell component 20 of the backrest component 12. In a crash, if a head surface comes into contact with the lower component of the display monitor 18 configured as a deflector 44, the deflector is pivoted backward in the direction of the arrow 46 onto the rear area of the backrest component 12. By the curved guide surface 48, the possibility is then created for impact on the upper edge 28 of the shell component 22.

The fastening mechanism 24 in question may also have an easily detachable adhesive or catch connection (not shown). Connection or adherence of the shell component 22 to the other structural components is effected exclusively by way of the elastic cover foil sheet. The shell component 22 may be in the form of a thin plastic material, but preferably is of a flexible material such as a suitable molded foam material.

By the shell design of the present invention being a wedge, the potential zone of impact for the seat occupant to the rear is covered over the width of this wedge. Since the wedge is detachably connected to the primary structure of the seat and is covered by an elastic foil sheet, the wedge initially behaves as does the fixed structure of the seat in the direction of the axis of acceleration. However, because of its configuration, the wedge may be displaced downward with little effort so that it can be retained between foil and primary structure. No significant forces can be generated, and no danger is created by loose components in the event of impact.

While one embodiment has been chosen to illustrate the invention, it will be understood by those skilled in the art that various changes and modifications can be made therein without departing from the scope of the invention as defined in the appended claims.

What is claimed is:

1. A passenger seat, comprising:
   a seat component;
   a backrest component coupled to said seat component and formed at least in part of a first shell component and a second shell component, said second shell component having wedge shape in cross section and having a planiform extension for impacting a head of a seat occupant in a following row of seats during a crash; and
   a fastening mechanism detachably connecting said second shell component to said first shell component;
   whereby, in the event of a sudden introduction of force such as during a crash, said second shell component is detached from said first shell component and other components of said backrest component.

2. A passenger seat according to claim 1 wherein
said second shell component is integrated into and formed as a part of said backrest component; and
said second shell component retains an initial shape and position in normal seat use.

3. A passenger seat according to claim 1 wherein
said second shell component is a hollow shell and has bracing webs in a cavity of said hollow shell, said bracing webs engaging rear components of said backrest component.

4. A passenger seat according to claim 3 wherein
each said bracing web extends vertically within said cavity, and is at least partially integrally joined to a side edge of said second shell component.

5. A passenger seat according to claim 1 wherein
said second shell component comprises a tip of said wedge shape directed toward said seat component, and a cushioned edge opposite said tip and directed toward a head rest on said backrest component.

6. A passenger seat according to claim 5 wherein
said cushioned edge is formed of foamed material.

7. A passenger seat according to claim 1 wherein
said second shell component undergoes a transition in a rear area of said backrest component, is flush with said backrest component, and is retained in position by cover material.

8. A passenger seat according to claim 7 wherein
said cover material comprises an elastic cover sheet.

9. A passenger seat according to claim 7 wherein
said fastening mechanism comprises an adhesive strip fastener.

10. A passenger seat according to claim 7 wherein
said fastening mechanism comprises a clip connection.

11. A passenger seat according to claim 7 wherein
said fastening mechanism comprises a catch connection.

12. A passenger seat according to claim 7 wherein
said fastening mechanism comprises an adhesive connection.

13. A passenger seat according to claim 7 wherein
said fastening mechanism comprises a cover sheet.

14. A passenger seat according to claim 7 wherein
said fastening mechanism comprises a cover material.

15. A passenger seat according to claim 1 wherein
said second shell component is mounted in said backrest component below a display monitor; and
a lower edge of said display monitor is pivotable through a predetermined angle and undergoes a transition to an upper edge of said second shell component.

16. A passenger seat according to claim 1 wherein
said second shell component is formed of an elastically flexible material.

17. A passenger seat according to claim 16 wherein
said elastically flexible material is molded foam material.

18. A passenger seat according to claim 1 wherein
said second shell component having wedge shape in cross section with a tip directed toward said seat component and having a planiform cushioned edge opposite said tip and directed toward a head rest on said backrest component for impacting a head of a seat occupant in a following row of seats during a crash.

19. A passenger seat, comprising:
a seat component;
a backrest component coupled to said seat component and formed at least in part of a first shell component and a second shell component, said second shell component being a hollow shell and having bracing webs in a cavity of said hollow shell, said bracing webs engaging rear components of said backrest component; and
a fastening mechanism on said bracing webs detachably connecting said second shell component to said first shell component;
whereby, in the event of a sudden introduction of force such as during a crash, said second shell component is detached from said first shell component and other components of said backrest component.

20. A passenger seat according to claim 19 wherein
each said bracing web extends vertically within said cavity, and is at least partially integrally joined to a side edge of said second shell component.

* * * * *